US012777521B2

(12) United States Patent
Roy et al.

(10) Patent No.: US 12,777,521 B2
(45) Date of Patent: Oct. 27, 2026

(54) TXOP SHARING PROTOCOL, METHOD, DEVICE, AND SYSTEM FOR COORDINATED SPATIAL REUSE

(71) Applicant: NXP USA, Inc., Austin, TX (US)

(72) Inventors: Sayak Roy, Kolkata (IN); Ankit Sethi, Pune (IN); Rui Cao, Sunnyvale, CA (US); Rong Zhang, San Jose, CA (US); Dong Wei, Austin, TX (US); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 242 days.

(21) Appl. No.: 18/800,050

(22) Filed: Aug. 10, 2024

(65) Prior Publication Data

US 2025/0056603 A1 Feb. 13, 2025

(30) Foreign Application Priority Data

Aug. 10, 2023 (IN) ............................ 202341053703
Aug. 11, 2023 (IN) ............................ 202341053860

(51) Int. Cl.
*H04W 74/0816* (2024.01)
*H04W 16/14* (2009.01)
(Continued)

(52) U.S. Cl.
CPC ....... *H04W 74/0808* (2013.01); *H04W 16/14* (2013.01); *H04W 72/0453* (2013.01); *H04W 72/0473* (2013.01); *H04W 72/541* (2023.01)

(58) Field of Classification Search
CPC ..... H04W 92/20; H04W 72/27; H04W 16/14; H04W 16/02; H04W 72/541;
(Continued)

(56) References Cited

U.S. PATENT DOCUMENTS

2021/0136679 A1* 5/2021 Verma .................. E02F 9/2292
2023/0107240 A1* 4/2023 Sundman ............. H04B 7/0452
370/329

(Continued)

OTHER PUBLICATIONS

IEEE "P802.11ax™/D8.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN," including Section 26.10: Spatial reuse operation and Section 26.11.6 SPATIAL_REUSE, Oct. 2020, 820 pages.

(Continued)

*Primary Examiner* — Shukri Taha

(57) ABSTRACT

In an IEEE 802.11 wireless system, a sharing AP device (1A) shares a transmission opportunity with a shared AP device (2A) by transmitting a coordinated spatial reuse opportunity announcement control frame packet having defined signal fields which are used by the shared AP device (2A) to compute a transmit power limit for limiting interference at a first sharing STA device (1S) associated with the sharing AP device (1A) when transmitting one or more first downlink packets from the shared AP device (2A) to a first shared STA (2S) device associated with the shared AP device (2A).

20 Claims, 5 Drawing Sheets

(51) Int. Cl.

| | |
|---|---|
| ***H04W 72/044*** | (2023.01) |
| ***H04W 72/0453*** | (2023.01) |
| ***H04W 72/541*** | (2023.01) |
| ***H04W 74/0808*** | (2024.01) |

(58) Field of Classification Search

CPC ......... H04W 72/0453; H04W 72/0473; H04W 74/0808; H04W 74/0816

See application file for complete search history.

(56) References Cited

U.S. PATENT DOCUMENTS

| | | | | |
|---|---|---|---|---|
| 2023/0164837 | A1* | 5/2023 | Han | H04W 52/243 370/329 |
| 2024/0224259 | A1* | 7/2024 | Sun | H04W 72/1263 |
| 2024/0381418 | A1* | 11/2024 | Ajami | H04W 74/0808 |
| 2024/0422825 | A1* | 12/2024 | Sun | H04W 74/0816 |

OTHER PUBLICATIONS

Jianhan Liu et al., Discussions on Multi-AP Coordination, IEEE 802.11-18/1509r0, Sep. 2018.

Gary Anwyl et al., Coordinated Spatial Reuse in a 4 AP Topology, IEEE 802.11-23/1023r2, Jul. 2023.

Kanke Wu et al., Performance of Coordinated Spatial Reuse, IEEE 802.11-23/1037r0, Jun. 2023.

* cited by examiner

2

TXOP SHARING PROTOCOL, METHOD, DEVICE, AND SYSTEM FOR COORDINATED SPATIAL REUSE

CROSS-REFERENCE TO RELATED APPLICATION AND PRIORITY CLAIM

This application claims the benefit of India Provisional Patent Application Serial No. 202341053703, entitled "Protocol for Coordinated Spatial Re-Use Using TXOP Sharing" filed on Aug. 10, 2023, and India Provisional Patent Application Serial No. 202341053860, entitled "Beamformed Coordinated Spatial Reuse with TXOP Sharing" filed on Aug. 11, 2023, each of which is incorporated by reference in its entirety as if fully set forth herein.

BACKGROUND

Field

The present disclosure is directed in general to wireless communication. In one aspect, the present disclosure relates generally to improving spectral efficiency in wireless local area network (WLAN) devices implementing the Institute of Electrical and Electronics Engineers (IEEE) 802.11 standard and any other standards and/or networks that can provide wireless transfer of data in wireless networks.

Description of the Related Art

An ever-increasing number of relatively inexpensive, low power wireless data communication services, networks and devices have been made available over the past number of years, promising near wire speed transmission and reliability. Enabling technology advances in the area of wireless communications, various wireless technology standards (including for example, the IEEE Standards 802.11a/b/g, 802.11n, 802.11ac, 802.11.ax and their updates and amendments, as well as the IEEE Standard 802.11be now in the process of being adopted) have been introduced for next-generation wireless systems that are known to persons skilled in the art and are collectively incorporated by reference as if set forth fully herein fully. These standards specify various methods of establishing connections between wireless communication devices (e.g., access points (APs) or non-AP devices) by transmitting various types of information using different transmission techniques.

Network throughput is a highly important performance indicator for such next-generation wireless systems, with recent standard meetings discussing a number of proposals for network throughput improvement, including (but not limited to) Coordinated OFDMA (C-OFDMA), Coordinated Time Division Multiple Access (c-TDMA), Coordinated Beamforming (C-BF), and Joint Transmission (JT). While each technique has its unique advantages and challenges, the C-BF and JT techniques provide significant network throughput benefits by enabling simultaneous transmission. Another technique presented in standards meetings is Coordinated Spatial Reuse (C-SR) which also enable simultaneous transmissions from multiple devices by controlling interference through power control. Techniques which are based on coordination, such as C-BF, rely on interference mitigation to enable simultaneous transmission from multiple stations. Existing techniques, such as C-BF and JT, which rely on the spatial isolation of devices have significant costs and complexities regarding synchronization requirements and the amount of signaling involved. And while the C-SR technique is a much simpler technique, it relies on intelligent power control among participating devices.

Another important performance enabler for such next-generation wireless fidelity (Wi-Fi) devices is improving spectral efficiency by making optimal use of the shared wireless medium. Existing standards have mechanisms for medium sharing with orthogonal basic service set (OBSS) stations for spatial reuse, such as OBSS packet detection (PD) and Parametrized Spatial Reuse (PSR). However, these schemes do not have strong interference control mechanisms, and there are challenges with accurately detecting packets in situations of asynchronous operations.

As seen from the foregoing, the existing solutions for wireless communications are extremely difficult at a practical level by virtue of the difficulty in efficiently improving network throughput and spectral efficiency with schemes used for optimizing the use of a shared wireless medium while balancing requirements for overhead, processing, and flexibility.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
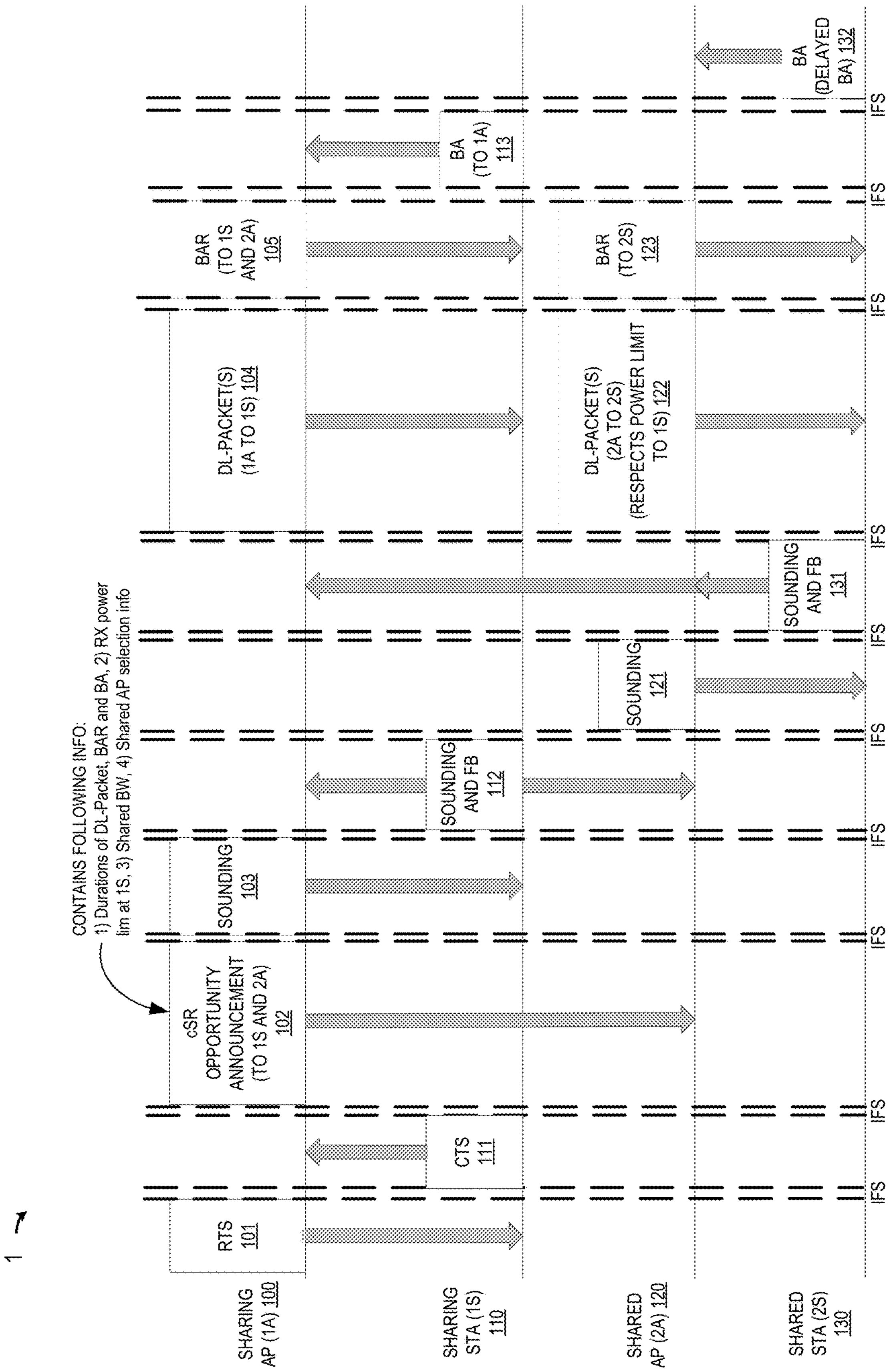
FIG. 1 diagrammatically depicts a synchronous transmission protocol between a sharing AP/BSS, sharing STA, shared AP/BSS, and shared STA in accordance with selected embodiments of the present disclosure.

A system, apparatus, and methodology are described for a wireless communication system in compliance with emerging 802.11 standards, such as 802.11bn, wherein a sharing AP/BSS device 1A and a shared AP/BSS device 2A simultaneously transmit downlink packets to, respectively, a sharing station (STA) device 1S and a shared STA device 2S over a shared, power controlled transmission opportunity. To this end, the sharing AP/BSS device 1A and the sharing STA device 1S exchange a plurality of MAC control frames (e.g., a Request to Send (RTS) frame and a Clear to Send (CTS) frame) to protect or hold a transmission opportunity (TXOP). In addition, the sharing AP/BSS device 1A transmits a coordinated spatial reuse (cSR) opportunity announcement control frame packet to the shared AP/BSS device 2A and a shared STA device 2S to signal the TXOP. In response to the cSR opportunity announcement frame, the sharing STA device 1S, the shared AP device 2A, and the shared station device 2S initiate a sequence of packet exchanges required for enabling beamformed TXOP sharing. This sequence of exchanges starts with the sharing AP device 1A transmitting a sounding packet (103). The sharing STA device 1S prepares beamforming feedback report based on this sounding packet and transmits a sounding and feedback packet (112), which enables the sharing AP device 1A to steer its transmissions towards the sharing STA device 1S. The sounding and feedback packet further allows the shared AP device 2A to implicitly estimate a set of channel coefficients pertaining to the wireless channel between 2A and 1S using long training fields present in the sounding and feedback packet. Following this transaction, the shared AP device 2A sends a sounding packet (121). The shared STA device 2S prepares a beamforming feedback report based on this sounding packet. Thereafter, the shared STA device sends a sounding and feedback packet (131). The feedback information present in this packet enables the shared AP device 2A to steer its transmission towards 2S. The long training fields present in the sounding and feedback packet (131) further allows the sharing AP device 1A to implicitly estimate a set of channel coefficients pertaining to the wireless channel between 1A and 2S. The beamformed transmissions are also power adjusted to ensure that the interference caused to other receiving STA devices participating in the simultaneous transmission is within defined tolerable limits. Thus, selected embodiments of the present disclosure provide a technique to reduce the complexities in terms of synchronization requirements and the amount of signaling involved in C-BF/JT, and to improve the isolation as compared to C-SR.

In other selected embodiments, a system, apparatus, and methodology are described for a wireless communication system in compliance with emerging 802.11 standards, such as 802.11be, wherein the devices involved may or may not steer their transmissions, whereby the shared AP and STA devices (e.g. 2A and 2S) may or may not reserve the medium between them, and whereby the shared AP device 2A may or may not synchronize its transmitted packets to the packets transmitted by the sharing AP device 1A In the context of the present disclosure, it will be understood by those skilled in the art that that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

References throughout this specification to "one embodiment", "an embodiment," "selected embodiments," or similar language means that a particular feature, structure, or characteristic described in connection with the indicated embodiment is included in at least one embodiment of the present disclosure. Thus, the phrases "in one embodiment", "in an embodiment," "selected embodiments," and similar language throughout this specification may, but do not necessarily, all refer to the same embodiment.

In accordance with selected embodiments of the present disclosure, there is disclosed a synchronized transmission protocol, method, device and system wherein transmission opportunities are shared in a wireless communication network between the sharing and shared stations with improvements in signal overhead and reducing the complexity of the hardware. As referenced in the Figures, the wireless communication network includes a sharing access point (AP) 1A (a.k.a., base station subsystem (BSS)), a sharing station (STA) 1S, a shared AP 2A, and a shared STA 2S which use MIMO beamforming to transmit and receive data packets. As used herein, the access point that shares its TXOP is called the sharing access point (AP), and the access point that benefits from this TXOP sharing is called the shared AP.

To provide additional details for an improved understanding of selected embodiments of the present disclosure, reference is now made to FIG. 1 which diagrammatically depicts a synchronous transmission protocol 1 between a sharing AP/BSS 100, sharing STA 110, shared AP/BSS 120, and shared STA 130 which are configured to use the synchronous transmission protocol with one sharing AP/BSS 100 and one shared AP/BSS 120. This illustration can be extended to multiple shared AP/BSSs. It is assumed that the APs 100, 120 can wirelessly communicate with each other (e.g., a dense deployment).

In the disclosed synchronous transmission protocol 1 for sharing transmission opportunities between multiple stations, FIG. 1 illustrates the packets that are exchanged by the sharing AP/BSS 100, sharing STA 110, shared AP/BSS 120, and shared STA 130.

For purposes of medium reservation, the sharing AP/BSS 100 transmits a first MAC control frame packet (e.g., a Request to Send (RTS)) 101 to the sharing STA 110, and in response to the RTS frame 101, the sharing STA 110 transmits a second MAC control frame packet (e.g., a Clear to Send (CTS)) 111 to the sharing AP 100 to protect the transmission opportunity for sharing AP/BSS 100 to transmit to the sharing STA 110.

In response to the CTS frame 111, the sharing AP/BSS 100 transmits a coordinated spatial reuse (cSR) opportunity announcement control frame packet 102 to the shared AP 120. In selected embodiments, the cSR opportunity announcement control frame packet 102 contains information which signals the duration of the DL packet(s) 104, BAR 105, and BA 113 so that the sharing AP 100 and shared AP 120 can synchronize their transmissions and the bandwidth over which the cSR DL-packet transmissions 104, 122 are to happen. In addition, the cSR opportunity announcement control frame packet 102 indicates the tolerable interference levels (as a receive power limit or interference limit) at the sharing station 110, as well as the shared bandwidth and the shared AP 120 selection information.

After sending the cSR opportunity announcement control frame packet 102, the sharing AP/BSS 100 transmits a sounding packet 103 to the sharing STA 110. With the sounding packet information, the sharing station 110 is enabled to estimate the channel state information (CSI) for computing the steering matrices for the sharing AP 100 to transmit packets from the sharing AP 100 to the sharing STA 110.

After computing the steering matrices, the sharing STA 110 transmits a sounding and feedback (FB) packet 112 to the sharing AP 100 and the shared AP 120. In this way, the sounding and FB packet 112 serves the dual purpose of making feedback information available at the sharing AP 100 and also enabling the shared AP 120 to measure the uplink (UL) channel from the sharing STA 110 to the shared AP 120 which will use this information to estimate the downlink (DL) channel from the shared AP 120 to the sharing STA 110.

In response to receiving the sounding and FB packet 112, the shared AP 120 transmits a sounding packet 121 to the shared STA 130. With the sounding packet information, the shared STA 130 is enabled to estimate the CSI for computing the steering matrices for the shared AP 120 to transmit packets from the shared AP 120 to the sharing STA 130.

After computing the steering matrices, the shared STA 130 transmits a sounding and feedback (FB) packet 131 to the shared AP 120 and the sharing AP 100. In this way, the sounding and FB packet 131 serves the dual purpose of making feedback information available at the shared AP 120 and also enabling the sharing AP 100 to measure the UL channel from the shared STA 130 to the sharing AP 100 which will use this information to estimate the DL channel from the sharing AP 100 to the shared STA 130.

At this point, the sharing AP 100 and shared AP 120 are respectively configured to simultaneously transmit one or more synchronized downlink data packets 104, 122 to, respectively, the sharing STA 110 and shared STA 130. To enable the transmit opportunity (TXOP) to be shared by the sharing AP 100 and shared AP 120, the shared AP 120 is configured to respect the power limit to the sharing STA 110.

After transmitting the downlink data packets 104, 122 over the shared TXOP, the sharing AP 100 and shared AP 120 are respectively configured to simultaneously transmit block acknowledgement request (BAR) packets 105, 123 to, respectively, the sharing STA 110 and shared STA 130. In response, the sharing STA 110 may acknowledge the BAR 105 by transmitting the block acknowledgement (BA) packet 113 to the sharing AP 100. And after a predetermined delay, the shared STA 130 may acknowledge the BAR 123 by transmitting the BA packet 132 to the shared AP 120.

Through exchange of the control frame/packets 101, 111, 102, 103, 112, 121, 131, the shared AP 120 implements a power-controlled mechanism for transmitting the downlink data packets 122 to the shared STA 130. To provide an improved understanding for how to determine the transmit power constraints for transmitting the downlink data packets over a shared transmit opportunity, the channel matrix from the sharing AP 100 to the sharing STA 110 may be defined as $H_{1S,1A}$, and the channel matrix from the sharing AP 100 to shared STA 130 may be defined as $H_{2S,1A}$. In addition, the steering matrix corresponding to $H_{1S,1A}$ may be defined as $V_{1S,1A}$. Based on the foregoing, the steered channel from the sharing AP 100 to the sharing STA 110 may be calculated using the steering matrix $V_{1S,1A}$ as $\hat{H}_{1S,1A}=H_{1S,1A} V_{1S,1A}$. In addition, the effective channel from the sharing AP 100 to shared STA 130 may be calculated as $\check{H}_{2S,1A}=H_{2S,1A}V_{1S,1A}$.

Since the sharing AP 100 needs to estimate this effective channel $\check{H}_{2S,1A}$ to control its power for transmitting to the shared STA 130, the sharing AP 100 is configured to estimate the effective channel $\check{H}_{2S,1A}$ by using the steering matrix $V_{1S,1A}$ which the sharing AP 100 receives as feedback from the sharing STA 110 in the sounding and FB packet 112. In particular, the sharing AP 100 is configured to estimate the effective channel $\check{H}_{2S,1A}$ by computing $$H_{1A,2S}^{T},$$

which is the transpose of the channel from the shared STA 130 to the sharing AP 100, estimated from the sounding and FB packet 112 received by the sharing AP 100 from the shared STA 130. Based on the channel matrix $H_{2S,1A}$, the sharing AP 100 is configured to calculate the interference power caused at the shared STA 130 as a function of the transmit power at the sharing AP 100, and can use this information to choose the transmit power at the sharing AP 100 for the cSR DL-packet transmission 104.

In addition the shared AP 120 determines its transmit power for the cSR DL-packet transmission 122 based on the receive power limit or interference limit information included in the cSR Opportunity Announcement frame 102 and the estimated $\check{H}_{1S,2A}$ channel.

Figure 2:
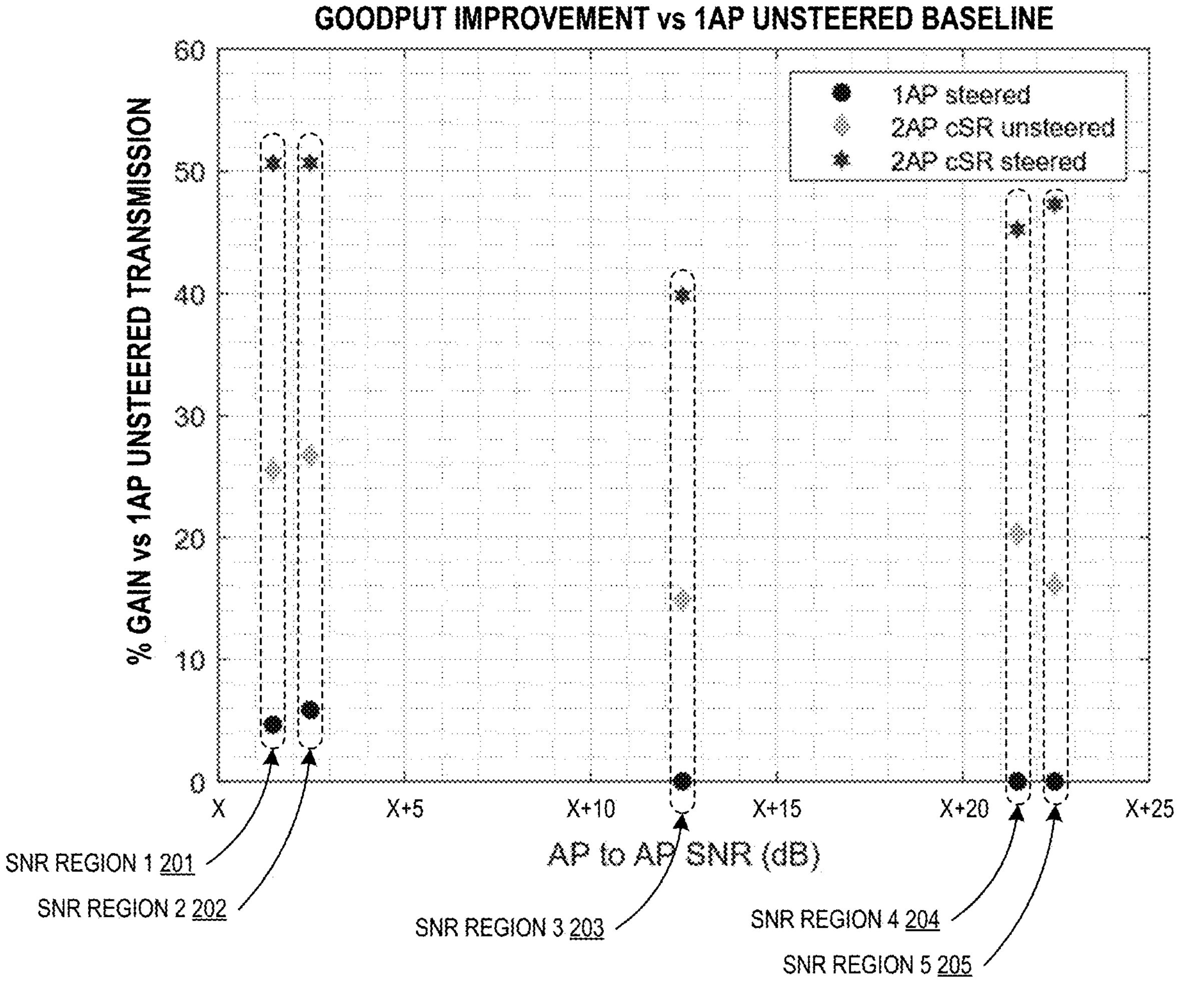
FIG. 2 depicts a simulated plot of goodput improvement using steered coordinated spatial reuse (cSR) in a 2-AP setup in different SNR regions in accordance with selected embodiments of the present disclosure.

To provide additional details for an improved understanding of selected embodiments of the present disclosure, reference is now made to FIG. 2 which depicts a simulated plot 2 of goodput improvement using steered coordinated spatial reuse (cSR) in a 2-AP setup in different SNR regions 201-205. In the first SNR region 201, the circle represents the simulated SNR values for 1 AP steered transmissions, the diamond represents the simulated SNR values for 2 AP cSR unsteered transmissions, and the star represents the SNR values for 2 AP steered transmissions. The same notations for the steering without cSR (1AP steered), cSR without steering (2AP cSR unsteered), and steered cSR (2AP cSR steered) are used in SNR regions 202-205. In the simulation used to generate the plot 2, the two APs have four antennas each and their associated stations have one antenna each, and each AP is sending a 20 MHz 1SS packet to their respective associated stations. The performance of steering without cSR (1AP steered) and cSR without steering (2AP cSR unsteered) are compared to show the promise of steered cSR (2AP cSR steered). As shown in the simulation plot 2, steered cSR can achieve 40-50% performance (sum goodput) gains over the case where only one AP transmits to its associated station.

As seen from the foregoing description, selected embodiments of the present disclosure provide a system, apparatus, protocol and methodology for using power-constrained beamforming to enable simultaneous transmissions from multiple devices during a power-controlled shared transmission opportunity (TXOP) which has a low signaling overhead, simple hardware requirements as compared to C-BF and JT transmission schemes, and greater isolation as compared to C-SR transmission schemes. In particular, the disclosed system, apparatus, protocol and methodology jointly uses spatial and power domain isolation to achieve a high degree of isolation among devices while requiring much less signaling and much simpler hardware as compared to C-BF/JT. In selected embodiments, the disclosed protocol for enabling coordinated spatial reuse with beamforming uses an exchange of RTS and CTS MAC control frame packets by the sharing AP device and sharing STA device. In addition, the disclosed protocol uses a cSR opportunity announcement frame that is transmitted by the sharing AP device to the shared AP device which contains information on the duration of the DL and BAR packets (for enabling synchronization), the BW information, the shared AP selection info, and the received power limit at the sharing STA device. In addition, the disclosed protocol uses a sounding packet that is transmitted by the sharing AP device to the sharing STA device which then transmits a sounding and feedback packet to the sharing AP device and the shared AP device to serve the dual purposes of full dimensional channel sounding as well as sending CSI feedback. In addition, the disclosed protocol synchronizes the transmission of DL packets from the sharing/shared AP devices to the sharing/shared STA devices by using the information from the previous packet exchange to derive power limits for the DL packet transmission. The disclosed protocol subsequently transmits block acknowledgment request (BAR) frames that are transmitted from the sharing/shared AP devices to the sharing/shared STA devices, followed by a staggered transmission of the block ack (BA) frames on the uplink to the sharing/shared AP devices. As disclosed herein, the method of deriving power limits at the sharing/shared AP devices is based on the unintentional beamforming directions, i.e. based on the power received by the OBSS non-AP STAs when each AP beamforms to its associated stations. In addition, the disclosed protocol enables SNR estimation and determining receive power limits based on packets transmitted within the current transmission opportunity (TXOP). The disclosed protocol also enables the shared AP device to compute its transmit power based on the interference it causes at the sharing STA device, which is estimated based on (a) the CSI feedback it receives from its associated shared STA device, and (b) the CSI between itself (i.e. the shared AP device) and the sharing STA device, which is estimated based on the uplink sounding and feedback packet received from the sharing STA device.

In accordance with selected embodiments of the present disclosure, there is disclosed a synchronized transmission protocol, method, device and system to improve spatial reuse in dense deployment scenarios by providing a coordinated spatial reuse for 802.11bn and later standards wherein a transmission opportunity (TxOP) holder can share the medium with an orthogonal basic service set (OBSS) station in order to maximize sum throughput while ensuring a certain level of performance for itself. As disclosed herein, the station that shares its TXOP is called the sharing station (STA), and the station that benefits from this TXOP sharing is called the shared STA. In this setting, the disclosed protocol is based upon a power control mechanism at the shared STAs for improving network throughput (sum throughput) while limiting interference at the sharing STA. Interference control relies upon the availability of path loss information (from the stations belonging to the sharing base subsystem (BSS)) at the shared BSS stations. While path loss from AP stations can be measured from beacon/probe packets, this is impossible for non-AP stations. Therefore, a mechanism for measuring path loss from non-AP stations belonging to the sharing BSS is required. In the present disclosure, the transmission of measurement packets from the non-AP stations belonging to the sharing BSS is disclosed. The measurement packet can have multiple training fields (e.g., STF/LTF) for accurate power measurement. The station's transmit power information is also conveyed through the measurement packet in order to enable the receiving station to derive path loss using the transmit power information and the measured received power. TXOP sharing with only one OBSS is explained since this simplifies the protocol significantly while still providing most of the network throughput gain.

The protocol involves forming groups of BSS devices called cSR groups. TXOP sharing happens between BSS devices belonging to the same cSR group. All stations convey the path loss they measure from beacon packets to their respective associated APs on a long-term basis (of the order of beacon scan frequency). For example, a sharing AP/BSS 1A knows the path loss from the shared AP/BSS 2A to the sharing STA 1S, where A denotes an AP, and S denotes a non-AP station (STA).

Figure 3:
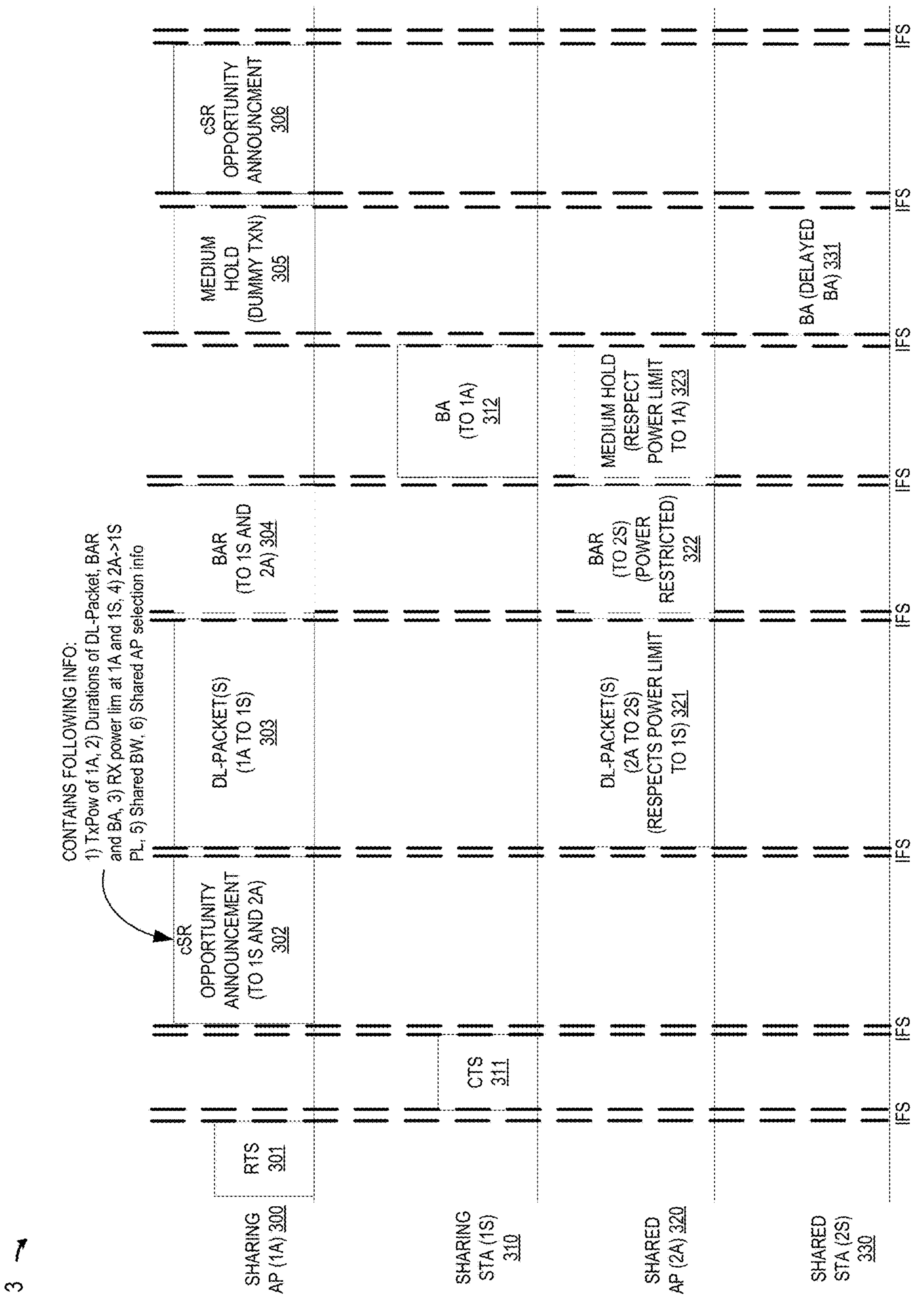
FIG. 3 diagrammatically depicts a synchronous packet transmission protocol without medium reservation at a shared AP/BSS in accordance with selected embodiments of the present disclosure.

To provide additional details for an improved understanding of selected embodiments of the present disclosure, reference is now made to FIG. 3 which diagrammatically depicts a synchronous transmission protocol 3 for a sharing AP/BSS 300, sharing STA 310, shared AP/BSS 320, and shared STA 330 which are configured to exchange a sequence of packets without medium reservation at the shared AP/BSS 320. To this end, the synchronous transmission protocol 3 addresses the issue of interference management associated with spatial reuse by relying on synchronized transmission from the shared and sharing access points (APs) 300, 310, thereby producing deterministic interference. In addition, the synchronous transmission protocol 3 helps avoid issues associated with packet detection.

In the synchronous packet transmission protocol 3 without medium reservation at the shared AP/BSS 320, the sharing AP/BSS 300 and sharing STA 310 reserve the medium by transmitting a first MAC control frame packet (e.g., RTS) 301 from the sharing AP/BSS 300 to the sharing STA 310. And in response to the RTS frame 301, the sharing STA 310 transmits a second MAC control frame packet (e.g., CTS) 311 to the sharing AP/BSS 300 to protect the transmission opportunity for the sharing AP/BSS 300 to transmit to the sharing STA 310.

In response to the CTS frame 311, the sharing AP/BSS 300 transmits a coordinated spatial reuse (cSR) opportunity announcement (COA) control frame packet 302 to the sharing STA 310, the shared AP/BSS 320 and the shared STA 330. In selected embodiments, the cSR opportunity announcement control frame packet 302 contains information which signals the transmit power of the sharing AP/BSS 300 which helps the shared AP/BSS 320 to choose the shared STA 330 to make optimal use of the shared transmission opportunity. The cSR opportunity announcement control frame packet 302 also includes the duration of the DL packet(s) 303/321, BAR 304/322, and BA 312/331 so that the sharing AP/BSS 300 and shared AP/BSS 320 can synchronize their transmissions and the bandwidth over which the cSR DL-packet transmissions 303, 321 are to happen. The information specifying the duration of DL-packet and BAR helps the shared AP/BSS 320 to align its packet transmissions with the sharing AP/BSS 300. In addition, the cSR opportunity announcement control frame packet 302 includes the tolerable interference levels (as the receive power limit or interference limit) at the sharing AP/BSS 300 and sharing STA 310. The shared AP/BSS 320 needs to know the receive power limit or interference limit at the sharing STA 310 in order to control its power so as not to interfere with the packet reception at the sharing STA 310. Furthermore, the shared AP/BSS 320 needs to know the receive power limit or interference limit at the sharing AP/BSS 300 for controlling the power of the "Medium hold" packet 323 to ensure that it does not interfere with packet reception at the sharing AP/BSS 300. The cSR opportunity announcement control frame packet 302 also includes the path loss between the shared AP/BSS 320 and the sharing STA 310. Besides the knowledge of the receive power limit or interference limit at the sharing STA 310, the shared AP/BSS 320 also needs to know the path loss to the sharing STA 310. This quantity is estimated by the sharing STA 310 through power measurement of the beacon packets received from the shared AP/BSS 320. Note that this measurement is not real-time and is only performed sporadically during the scanning phase. Further, it is assumed that the sharing STA 310 periodically exchanges this information with the sharing AP/BSS 300 through management frames. In addition, the cSR opportunity announcement control frame packet 302 includes the shared bandwidth which specifies the shared frequency resource over which cSR is enabled. The cSR opportunity announcement control frame packet 302 also includes the shared AP selection information. This field is used by the sharing AP/BSS 300 to choose its preferred BSS to share the medium with. On reception of the cSR opportunity announcement frame 302, the indicated shared AP/BSS 320 will transmit after an IFS period from the end of the cSR opportunity announcement frame. This field indicates a value that may be interpreted as "No preference" so that any node receiving the cSR opportunity announcement frame can participate in the shared transmission opportunity.

Upon expiration of the inter-frame spaces (IFS) duration after the end of the cSR opportunity announcement control frame packet 302, the sharing AP/BSS 300 and shared AP/BSS 320 are respectively configured to simultaneously transmit one or more synchronized downlink data packets 303, 321 to, respectively, the sharing STA 310 and shared STA 330. To enable the transmit opportunity (TXOP) to be shared by the sharing AP/BSS 300 and shared AP/BSS 320, the DL packet 321 from the shared AP/BSS 320 will be padded appropriately to match the length of the DL packet 303 from the shared AP/BSS 100. During the shared synchronized DL transactions 303, 321, the shared AP/BSS 320 will respect the receive power limit or interference limit at the sharing STA 310. The shared AP/BSS 320 can use information derived from the COA control frame packet 302 to derive its transmit power limit to satisfy this constraint.

After transmitting the downlink data packets 303, 321 over the shared TXOP, the sharing AP/BSS 300 and shared AP/BSS 320 are respectively configured to simultaneously transmit block acknowledgement request (BAR) packets 304, 322. In particular, the sharing AP/BSS 300 transmits the BAR packet 304 to the sharing STA 310 and the shared AP/BSS 320, while the shared AP/BSS 320 transmits the BAR packet 322 to the shared STA 330.

In response to receiving the BAR packet 304, the sharing STA 310 transmits a BA packet 312 to the sharing AP/BSS 300. In addition, the shared AP/BSS 320 responds to the BAR packet 304 by simultaneously transmitted a "Medium Hold" packet 323 of the same duration as the BA packet 312, but respecting the SNR limit at the sharing STA 310.

Upon expiration of the inter-frame spaces (IFS) duration after the end of the medium hold packet 323, the shared STA 330 responds to the BAR packet 322 by transmitting a (delayed) BA packet 331 to the shared AP/BSS 320. During transmission of the (delayed) BA packet 331, the sharing AP/BSS 300 is configured to transmit a "Medium Hold" packet 305 if it wants to hold the medium for a subsequent transaction within the current TxOP. Following transmission of the (delayed) BA packet 331, the sharing AP/BSS 300 may transmit another cSR opportunity announcement (COA) control frame packet 306 to indicate the duration of the next sequence of packets by specifying the duration of the DL-packet, BAR, BA, thereby enabling the existing shared AP/BSS 320 to synchronize its transactions with the sharing AP/BSS 300. Alternatively, the sharing AP/BSS 300 can choose a different shared AP by changing the "sharing AP selection info" field in the COA control frame packet 306.

Figure 4:
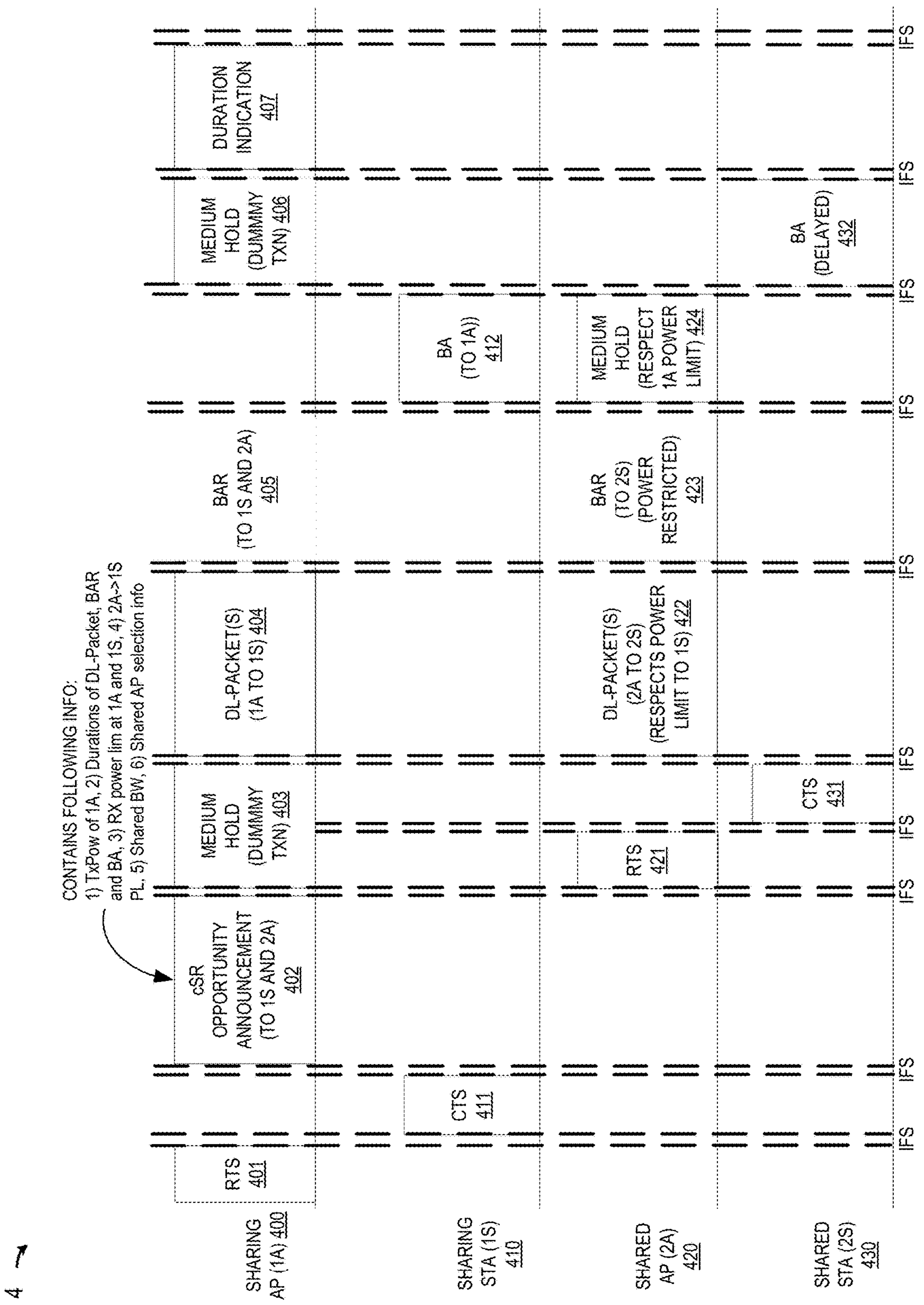
FIG. 4 diagrammatically depicts a synchronous packet transmission protocol with medium reservation at a shared AP/BSS in accordance with selected embodiments of the present disclosure.

To provide additional details for an improved understanding of selected embodiments of the present disclosure, reference is now made to FIG. 4 which diagrammatically depicts a synchronous transmission protocol 4 for a sharing AP/BSS 400, sharing STA 410, shared AP/BSS 420, and shared STA 430 which are configured to exchange a sequence of packets with medium reservation at the shared AP/BSS 420. To this end, the synchronous transmission protocol 4 addresses the issue of interference management associated with spatial reuse by allowing TXOP sharing in both uplink and downlink directions, thereby producing deterministic interference.

In the synchronous packet transmission protocol 4 with medium reservation at the shared AP/BSS 420, the sharing AP/BSS 400 and sharing STA 410 reserve the medium by transmitting a first MAC control frame packet (e.g., RTS) 401 from the sharing AP/BSS 400 to the sharing STA 410. In response to the RTS packet 401, the sharing STA 410 transmits a second MAC control frame packet (e.g., CTS) 411 to the sharing AP/BSS 400 to protect the transmission opportunity for the sharing AP/BSS 400 to transmit to the sharing STA 410.

In response to the CTS frame 411, the sharing AP/BSS 400 transmits a cSR opportunity announcement (COA) control frame packet 402 to the sharing STA 410 and the shared AP/BSS 420. In selected embodiments, the COA control frame packet 402 contains information which signals the transmit power of the sharing AP/BSS 400; the duration of the DL packet(s) 404/422, BAR 405/423, and BA 412/432; the tolerable interference levels (as the receive power limit) at the sharing AP/BSS 400 and sharing STA 410; the pathloss between the shared AP/BSS 420 and the sharing STA 410; the shared bandwidth which specifies the shared frequency resource over which cSR is enabled; and the shared AP selection information. The information contained in the COA control frame packet 402 is used by the sharing STA 410 and the shared AP/BSS 420 as described above with reference to FIG. 3.

Upon expiration of the inter-frame spaces (IFS) duration after the end of the COA control frame packet 402, the shared AP/BSS 420 transmits a third MAC control frame packet (e.g., RTS) 421 to the shared STA 430. Note that the RTS packet 421 is not required to be power restricted. In response to the RTS packet 421, the shared STA 430 transmits a fourth MAC control frame packet (e.g., CTS) 431 to the shared AP/BSS 420 to protect the transmission opportunity for the shared AP/BSS 420 to transmit to the shared STA 430. During the exchange of the RTS packet 421 and CTS packet 431 in the shared BSS, the sharing AP/BSS 400 transmits a "Medium Hold" packet 403. Note that the power of the "Medium Hold" packet 403 should be such that it does not cause interference with the reception of the CTS frame 431 by the shared AP/BSS 420. The duration of the "Medium Hold" packet 403 will be sufficient to cover the duration of the RTS packet 421 and CTS packet 431. This time duration is also used by the sharing and shared AP/BSS devices 400, 420 to synchronize the transmission of their DL packets 404, 422. In other words, the synchronized DL packet transmission 404, 422 will start TMH+2*IFS from the end of the COA control frame packet 402, where TMH is the duration of the "Medium Hold" packet 403. Following transmission of the synchronized DL packets 404, 422, the sharing AP/BSS 400 and shared AP/BSS 420 transmit their synchronized BAR packets 405, 423. Following transmission of the BAR packets 405, 423, the sharing STA 410 will respond by transmitting a BA packet 412 to the sharing AP/BSS 400. While the sharing STA 410 transmits the BA packet 412, the shared AP/BSS 420 will transmit a "Medium Hold" packet 424 that respects the SNR limit at the sharing AP/BSS 400. Note that the shared AP/BSS 420 can control its power to the sharing AP/BSS 400 since the shared AP/BSS 420 knows the pathloss between the shared AP/BSS 420 and the sharing AP/BSS 420. Following the transmission of the BA packet 412, the shared STA 430 will transmit its delayed BA 432 to the shared AP/BSS 420. While the shared STA 430 transmits the delayed BA packet 432, the sharing AP/BSS 400 may transmit a Medium Hold packet 406 if it wants to hold the medium for a subsequent transaction within the same TxOP. For the next sequence of transactions, the sharing AP/BSS 400 may choose to share the medium with the existing shared BSS, or it may choose to initiate medium sharing with another BSS. In either case, the sharing AP/BSS 400 can send an additional COA packet (where it may or may not change the shared AP selection info) or a duration indication packet 407.

Figure 5:
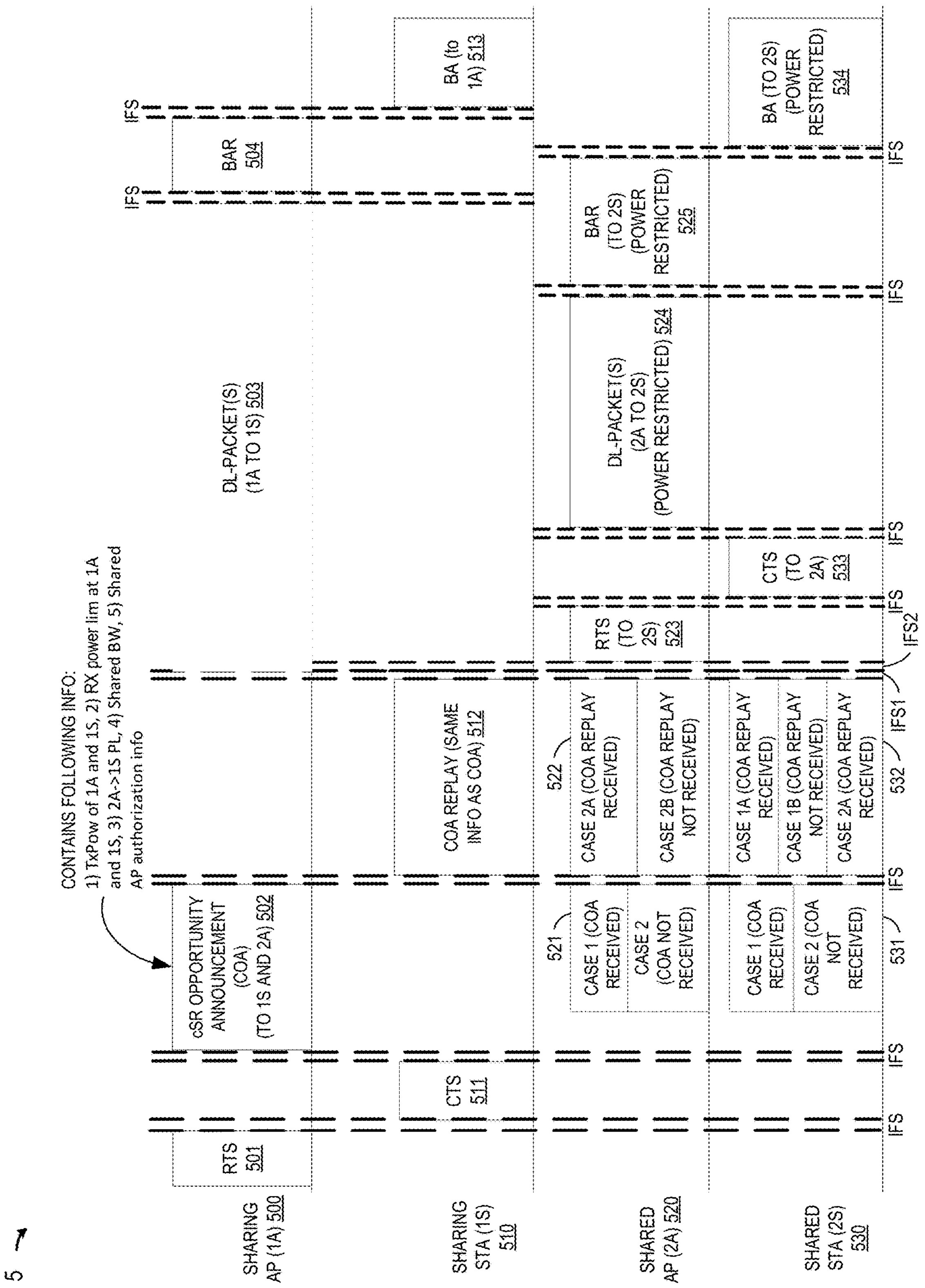
FIG. 5 diagrammatically depicts an asynchronous packet transmission protocol in accordance with selected embodiments of the present disclosure.

To provide additional details for an improved understanding of selected embodiments of the present disclosure, reference is now made to FIG. 5 which diagrammatically depicts an asynchronous transmission protocol 5 for a sharing AP/BSS 500, sharing STA 510, shared AP/BSS 520, and shared STA 530 which are configured to achieve complete asynchronous operation in stations belonging to different basic service sets within the shared TXOP duration.

In the asynchronous packet transmission protocol 5, the sharing AP/BSS 500 and sharing STA 510 initiate the transaction by transmitting a first MAC control frame packet (e.g., RTS) 501 from the sharing AP/BSS 500 to the sharing STA 510, and then sending a response MAC control frame packet (e.g., CTS) 511 from the sharing STA 510 to the sharing AP/BSS 500 to protect the transmission opportunity for the sharing AP/BSS 500 to transmit to the sharing STA 510.

In response to the CTS frame 511, the sharing AP/BSS 500 transmits a cSR opportunity announcement (COA) control frame packet 502 to the sharing STA 510 and the shared AP/BSS 520. In selected embodiments, the COA control frame packet 502 contains information which signals the transmit power of the sharing AP/BSS 500 and the sharing STA 510; the SNR limit at the sharing AP/BSS 500 and sharing STA 510; the pathloss between the shared AP/BSS 520 and the sharing STA 510; the shared bandwidth which specifies the shared frequency resource over which cSR is enabled; and the shared AP authorization information which contains the address of the selected shared AP and the time duration for which shared opportunity is granted. The information contained in the COA control frame packet 502 is used by the sharing STA 510 and the shared AP/BSS 520 substantially as described above with reference to FIGS. 3-4, but in the absence of specified duration information in the COA control frame packet 502, one of two possibilities can happen at the shared AP/BSS 520.

In the situation where the shared AP/BSS 520 receives the COA control frame packet 502, the shared AP/BSS 520 responds by (1) preparing to take advantage of the shared transmit opportunity obtained from the sharing AP/BSS 500 while (2) respecting the SNR limits at the sharing AP/BSS 500 and the sharing STA 510, as indicated at dashed block 521 (Case 1—COA RECEIVED). However, when the shared AP/BSS 520 does not receive the COA control frame packet 502 (which can happen if the shared AP/BSS 520 is hidden from the sharing AP/BSS 500), the shared AP/BSS 520 needs to wait for a COA replay packet 512 from the sharing STA 510 (described below), as indicated at dashed block 521 (Case 2—COA NOT RECEIVED).

Similarly, one of two possibilities can happen at the shared STA 530. In the situation where the shared STA 530 receives the COA control frame packet 502, the shared STA 530 responds by preparing to take advantage of the shared transmit opportunity obtained from the sharing AP/BSS 500 while respecting the SNR limits at the sharing AP/BSS 500 and the sharing STA 510, as indicated at dashed block 531 (Case 1—COA RECEIVED). However, when the shared STA 530 does not receive the COA control frame packet 502 (which can happen if the shared STA 530 is hidden from the sharing AP/BSS 500), the shared STA 530 needs to wait for a COA replay packet 512 from the sharing STA 510 (described below), as indicated at dashed block 531 (Case 2—COA NOT RECEIVED).

Upon expiration of the inter-frame spaces (IFS) duration after the end of the COA control frame packet 502, the sharing STA 510 transmits a COA replay packet 512 that contains the same information as in the COA packet 502. In selected embodiments, the COA replay packet 512 may contain fields that can enable reliable power measurement (such as STF fields).

In the situation where the shared AP/BSS 520 could not hear the COA packet 502, one of two possibilities can happen at the shared AP/BSS 520 with respect to the COA replay packet 512. In the situation where the shared AP/BSS 520 receives the COA replay packet 512, the shared AP/BSS 520 responds by (1) preparing to take advantage of the shared transmit opportunity obtained from the sharing AP/BSS 500 while (2) respecting the SNR limits at the sharing AP/BSS 500 and the sharing STA 510, as indicated at dashed block 522 (Case 2A—COA REPLAY RECEIVED). However, when the shared AP/BSS 520 does not receive the COA replay packet 512, the shared AP/BSS 520 performs one of two conditional actions, as indicated at dashed block 522 (Case 2B—COA REPLAY NOT RECEIVED). In a first conditional action where the shared AP/BSS 520 could detect (not decode) one or both of the COA packet 502 and the COA replay packet 512 above the packet detection (PD) threshold, the shared AP/BSS 520 will not transmit during BSS1's TxOP. However, in a second conditional action where the shared AP/BSS 520 could not detect the COA packet 502 and the COA replay packet 512 above the PD threshold, the shared AP/BSS 520 will perform physical and virtual carrier sensing as usual and transmit without any restriction. As a result of not receiving the COA replay packet 512, the shared AP/BSS 520 performs NAV as usual, and there is no power limit to respect.

In the situation where the shared STA 530 could not hear the COA packet 502, one of two possibilities can happen at the shared AP/BSS 520 with respect to the COA replay packet 512. In the situation where the shared STA 530 receives the COA replay packet 512, the shared STA 530 responds by preparing to take advantage of the shared transmit opportunity obtained from the sharing AP/BSS 500 while respecting the SNR limits at the sharing AP/BSS 500 and the sharing STA 510, as indicated at dashed block 532

(Case 1A—COA REPLAY RECEIVED). However, when the shared STA 530 does not receive the COA replay packet 512, the shared STA 530 performs one of two conditional actions, as indicated at dashed block 532 (Case 1B—COA REPLAY NOT RECEIVED). In a first conditional action where the shared STA 530 could detect (not decode) one or both of the COA packet 502 and the COA replay packet 512 above the PD threshold, the shared STA 530 will not initiate transmissions during BSS1's TxOP, meaning that it can still respond to control frames, such as a Block Ack request. However, in a second conditional action where the shared STA 530 could not detect the COA packet 502 and the COA replay packet 512 above the PD threshold, the shared STA 530 will perform physical and virtual carrier sensing as usual and transmit without any restriction. As a result of not receiving the COA replay packet 512, the shared AP/BSS 520 performs NAV as usual, and there is no power limit to respect.

In the situation where the shared STA 530 can decode one of the COA packet 502 or COA replay packet 512, the shared STA 530 performs a power measurement on the COA replay packet 512, as indicated at dashed block 532 (Case 2A—COA REPLAY RECEIVED). In selected embodiments, the shared STA 530 performs pathloss measurement through power measurement on the COA replay packet. In selected embodiments, the shared AP/BSS 520 may perform a power/pathloss measurement on the COA replay packet 512 and respects power limits at both the sharing AP/BSS 500 and the sharing STA 510 while transmitting to the shared STA 530. While the shared AP/BSS 520 may also perform power measurement, this is optional since the pathloss is available from the COA packet 502 or COA replay packet 512.

Upon expiration of a inter-frame spaces (IFS1) duration after the end of the COA replay packet 512, the sharing AP/BSS 500 can transmit its DL/UL packet 503 to the sharing STA 510. To avoid overlapping with the STF duration of the sharing AP/BSS 500, the shared AP/BSS 520 waits for another IFS duration (IFS2) before exchanging the RTS packet 523 and CTS packet 533 with the shared STA 530 which then transmits the DL data packet(s) 524 to the shared STA 530. With this arrangement, packet boundary alignment between the DL packets 503, 524 is not required, and the sharing AP/BSS 500 and shared AP/BSS 520 can achieve fully asynchronous transactions beyond this point up to the end of the shared TxOP. Another option is for the shared AP/BSS 520 is to wait until a signal field containing BSS identity (e.g. BSS color) is received (not shown), from which the shared AP/BSS 520 can check if the BSS color matches the sharing AP/BSS 500. This can avoid collisions with some other OBSS.

As seen from the foregoing description, selected embodiments of the present disclosure provide a system, apparatus, and methodology for using synchronous or asynchronous protocols with power-constrained beamforming to enable transmissions from multiple devices during a shared transmission opportunity (TXOP) which has a low protocol overhead and a power control mechanism to ensure optimal sum throughput while ensuring throughput at the sharing AP/BSS stations (fairness). In particular, the synchronous protocol embodiments have deterministic interference and lower overhead. And the asynchronous protocol embodiments enable asynchronous transmission have higher flexibility with no strict boundary alignment requirement, allowing for the possibility to share TXOP in both UL and DL directions. With the disclosed protocols, there is no requirement for a central controller to allocate power In particular, the disclosed system, apparatus, protocol, and methodology jointly uses spatial and power domain isolation to achieve a high degree of isolation among devices while requiring much less signaling and much simpler hardware as compared to C-BF/JT. In selected embodiments, there is disclosed a synchronized signaling protocol without medium reservation at the shared STA for enabling coordinated spatial reuse. In other selected embodiments, there is disclosed a synchronized signaling protocol with medium reservation at the shared STA for enabling coordinated spatial reuse. In other selected embodiments, there is disclosed an asynchronous signaling protocol that enables fully asynchronous simultaneous transmissions in both directions. In the disclosed synchronized signaling protocols, the sharing AP device transmits a cSR opportunity announcement frame to the sharing STA device and shared AP device which contains information on the transmit power of the sharing AP device, the duration of the DL, BAR, and BA packets (for enabling synchronization), the receive power limit or interference limit at the sharing AP device and sharing STA device, the measured path loss between the shared AP device and the sharing STA device, the bandwidth over which TxOP sharing happens, and the shared AP selection info (i.e., which AP device is scheduled as shared AP device by the sharing AP device). In the disclosed asynchronous signaling protocols, the disclosed protocol uses a COA replay frame that is transmitted by the sharing STA device to range-extend reception of the above information. In addition, the disclosed protocol provides for periodic reporting of path loss measurement reports (with respect to each AP device) collected by each non-AP STA, with their associated AP devices. The disclosed protocol also has the sharing AP device transmit "Medium Hold" packets to retain medium access when the shared AP/STA device is transmitting, and vice-versa. The disclosed protocol also uses non-real-time measured power (beacon packet-based) to derive the receive power limit or interference limits by the sharing AP device and transmit power by the shared AP/STA device.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

By now it should be appreciated that there has been provided an apparatus, method, system, and protocol for sharing a transmission opportunity between a plurality of access point (AP) devices in accordance with an Institute of Electrical and Electronics Engineers (IEEE) 802.11 protocol. In the disclosed method, a shared AP device receives a first coordinated spatial reuse (cSR) opportunity announcement (COA) control frame packet. As disclosed, the first COA control frame packet includes at least four signal fields selected from the group of signal fields which includes: (1) a first signal field specifying a transmit power level of a sharing AP device which transmits the first COA control frame packet, (2) a second signal field specifying duration information for one or more downlink packets to be transmitted by the sharing AP device and shared AP device, a block acknowledgement request (BAR) packet to be transmitted by the sharing AP device and shared AP device, and a block acknowledgement (BA) packet to be received by the sharing AP device and shared AP device, (3) a third signal field specifying the receive power limit information for at least a first sharing STA device associated with the sharing AP device, (4) a fourth signal field specifying pathloss information between the shared AP device and the first sharing STA device, (5) a fifth signal field specifying a shared frequency bandwidth (BW) resource over which the first COA control frame packet is enabled, and (6) a sixth signal field specifying a selected shared AP device. In selected embodiments, the disclosed method also includes receiving, at the shared AP device, a medium hold packet after receiving the first COA control frame packet, where the medium hold packet has a predetermined minimum duration that is sufficient to allow the shared AP device and first shared STA device to exchange medium reservation packets, and where the shared AP device synchronizes, during the predetermined minimum duration of the medium hold packet, the transmission of the one or more first downlink packets by the shared AP device to the first shared STA device to be synchronized with one or more second downlink packets transmitted by the sharing AP device to the first sharing STA device within the shared transmission opportunity. In such embodiments, the medium hold packet received at the shared AP device has a receive power level that does not interfere with reception of any medium reservation packet by the shared AP device from the first shared STA device. In response to the at least four signal fields from the first COA control frame packet, the shared AP device computes a transmit power limit for limiting interference at the first sharing STA device when transmitting one or more first downlink packets by the shared AP device to a first shared STA device associated with the shared AP device. In addition, the shared AP device applies the transmit power limit when transmitting one or more first downlink packets to the first shared STA device within a shared transmission opportunity defined at the sharing AP device. In selected embodiments, the shared AP device also receives one or more sounding and feedback packets, and then computes a first channel state information estimate between the shared AP device and the first sharing STA device, and a second channel state information estimate between the shared AP device and the first shared STA device, where the shared AP device computes the transmit power limit based on the first and second channel state information estimates. In selected embodiments, the shared AP device transmits the one or more first downlink packets to the first shared STA device without medium reservation at the shared AP device, where the one or more first downlink packets are synchronized with one or more second downlink packets transmitted by the sharing AP device to the first sharing STA device within the shared transmission opportunity. In other selected embodiments, the shared AP device transmits the one or more first downlink packets to the first shared STA device with medium reservation at the shared AP device, where the one or more first downlink packets are synchronized with one or more second downlink packets transmitted by the sharing AP device to the first sharing STA device within the shared transmission opportunity. In other selected embodiments, the shared AP device transmits the one or more first downlink packets to the first shared STA device, where the one or more first downlink packets are not synchronized with one or more second downlink packets transmitted by the sharing AP device to the first sharing STA device within the shared transmission opportunity.

In another form, there is provided an apparatus, method, system, and protocol for sharing a transmission opportunity between a plurality of access point (AP) devices in accordance with an Institute of Electrical and Electronics Engineers (IEEE) 802.11 protocol. In the disclosed method, a sharing AP device transmits a first coordinated spatial reuse (cSR) opportunity announcement (COA) control frame packet. As disclosed, the first COA control frame packet includes at least four signal fields selected from the group of signal fields which includes: (1) a first signal field specifying a transmit power level of the sharing AP device which transmits the first COA control frame packet, (2) a second signal field specifying duration information for one or more downlink packets to be transmitted by the sharing AP device and a shared AP device, a block acknowledgement request (BAR) packet to be transmitted by the sharing AP device and shared AP device, and a block acknowledgement (BA) packet to be received by the sharing AP device and shared AP device, (3) a third signal field specifying the receive power limit information for at least a first sharing STA device associated with the sharing AP device, (4) a fourth signal field specifying pathloss information between the shared AP device and the first sharing STA device, (5) a fifth signal field specifying a shared frequency bandwidth (BW) resource over which the first COA control frame packet is enabled, and (6) a sixth signal field specifying a selected shared AP device. In selected embodiments, the disclosed method also includes transmitting, by the sharing AP device, a medium hold packet after transmitting the first COA control frame packet, where the medium hold packet has a predetermined minimum duration that is sufficient to allow the shared AP device and first shared STA device to exchange medium reservation packets, and where the sharing AP device synchronizes, during the predetermined minimum duration of the medium hold packet, the transmission of the one or more first downlink packets by the sharing AP device to the first sharing STA device to be synchronized with one or more second downlink packets transmitted by the shared AP device to the first shared STA device within the shared transmission opportunity. In such embodiments, the medium hold packet transmitted by the sharing AP device has a transmit power level that does not interfere with reception of any medium reservation packet by the shared AP device from the first shared STA device. In response to the at least four signal fields from the first COA control frame packet, the sharing AP device computes a transmit power limit for limiting interference at the first shared STA device when transmitting one or more first downlink packets by the sharing AP device to a first sharing STA device. In addition, the sharing AP device applies the transmit power limit when transmitting one or more first downlink packets to the first sharing STA device within a shared transmission opportunity defined at the sharing AP device. In selected embodiments, the sharing AP device also receives one or more sounding and feedback packets, and then computes a first uplink channel measurement from the first shared STA device to the sharing AP device, and a second downlink channel estimate between the sharing AP device and the first sharing STA device, where the sharing AP device computes the transmit power limit based on the first uplink channel measurement and the second downlink channel estimate. In selected embodiments, the sharing AP device synchronizes one or more first downlink packets with one or more second downlink packets transmitted by the shared AP device to the first shared STA device without medium reservation at the shared AP device. In other selected embodiments, the sharing AP device synchronizes one or more first downlink packets with one or more second downlink packets transmitted by the shared AP device to the first shared STA device with medium reservation at the shared AP device. In other selected embodiments, the sharing AP device does not synchronize the transmission of one or more first downlink packets with one or more second downlink packets transmitted by the shared AP device to the first shared STA device within the shared transmission opportunity. In other selected embodiments, the sharing AP device transmits a medium hold packet after transmitting the first COA control frame packet, where the medium hold packet contains one or more signal estimation fields for use by the first sharing AP device in computing an estimation of carrier frequency offset or channel coefficients between the sharing AP device and the first sharing STA device.

In yet another form, there is provided a first wireless access point (AP) transceiver device (1A), method, and system for sharing a transmission opportunity with a second wireless AP transceiver device (2A) in accordance with IEEE 802.11 protocol. The disclosed first wireless AP transceiver device (1A) includes a transceiver to exchange one or more frames with one or more wireless devices, a processor, and a memory storing instructions. When executed by the processor, the instructions cause the first wireless AP transceiver device (1A) to transmit a coordinated spatial reuse (cSR) opportunity announcement (COA) control frame packet to at least the second wireless AP transceiver device (2A), where the COA control frame packet comprises a plurality of signal fields for defining a shared transmission opportunity to be used by the first wireless AP transceiver device (1A) and the second wireless AP transceiver device (2A). In addition, the execution of the instructions at the processor causes the first wireless AP transceiver device (1A) to compute, based on the plurality of signal fields in the COA control frame packet, a transmit power limit for limiting interference at a first shared station (STA) device (2S) associated with the second wireless AP transceiver device (2A) when transmitting one or more first downlink packets by the first wireless AP transceiver device (1A) to a first sharing STA device (1S) associated with the first wireless AP transceiver device (1A). In addition, when executed by the processor, the instructions cause the first wireless AP transceiver device (1A) to apply the transmit power limit when transmitting one or more first downlink packets to the first sharing STA device (1S) within the shared transmission opportunity. In selected embodiments, the COA control frame packet includes at least four signal fields selected from the following group of signal fields which includes: (1) a first signal field specifying a transmit power level of the first wireless AP transceiver device (1A) which transmits the COA control frame packet; (2) a second signal field specifying duration information for one or more downlink packets to be transmitted by the first wireless AP transceiver device (1A) and the second wireless AP transceiver device (2A), a block acknowledgement request (BAR) packet to be transmitted by the first wireless AP transceiver device (1A) and the second wireless AP transceiver device (2A), and a block acknowledgement (BA) packet to be received by the first wireless AP transceiver device (1A) and the second wireless AP transceiver device (2A); (3) a third signal field specifying a receive power limit information for at least the first sharing STA device (1S) associated with the first wireless AP transceiver device (1A); (4) a fourth signal field specifying pathloss information between the second wireless AP transceiver device (2A) and the first sharing STA device (1S); (5) a fifth signal field specifying a shared frequency bandwidth (BW) resource over which the COA control frame packet is enabled; and (6) a sixth signal field specifying a selected second wireless AP transceiver device (2A).

In yet another form, there is provided a first wireless access point (AP) transceiver device (2A), method, and system for sharing a transmission opportunity with a second wireless AP transceiver device (1A) in accordance with IEEE 802.11 protocol. The disclosed first wireless AP transceiver device (2A) includes a transceiver to exchange one or more frames with one or more wireless devices, a processor, and a memory storing instructions. When executed by the processor, the instructions cause the first wireless AP transceiver device (2A) to receive a coordinated spatial reuse (cSR) opportunity announcement (COA) control frame packet from the second wireless AP transceiver device (1A), where the COA control frame packet comprises a plurality of signal fields for defining a shared transmission opportunity to be used by the first wireless AP transceiver device (2A) and the second wireless AP transceiver device (1A). In addition, the execution of the instructions at the processor causes the first wireless AP transceiver device (2A) to compute, based on the plurality of signal fields in the COA control frame packet, a transmit power limit for limiting interference at a first sharing station (STA) device (1S) associated with the second wireless AP transceiver device (1A) when transmitting one or more first downlink packets by the first wireless AP transceiver device (2A) to a first shared STA device (2S) associated with the first wireless AP transceiver device (2A). In addition, when executed by the processor, the instructions cause the first wireless AP transceiver device (2A) to apply the transmit power limit when transmitting one or more first downlink packets to the first shared STA device (2S) within the shared transmission opportunity. In selected embodiments, the COA control frame packet includes at least four signal fields selected from the following group of signal fields which includes: (1) a first signal field specifying a transmit power level of the second wireless AP transceiver device (1A) which transmits the COA control frame packet; (2) a second signal field specifying duration information for one or more downlink packets to be transmitted by the first wireless AP transceiver device (2A) and the second wireless AP transceiver device (1A), a block acknowledgement request (BAR) packet to be transmitted by the first wireless AP transceiver device (2A) and the second wireless AP transceiver device (1A), and a block acknowledgement (BA) packet to be received by the first wireless AP transceiver device (2A) and the second wireless AP transceiver device (1A); (3) a third signal field specifying a receive power limit information for at least the first sharing STA device (1S) associated with the second wireless AP transceiver device (1A); (4) a fourth signal field specifying pathloss information between the first wireless AP transceiver device (2A) and the first sharing STA device (1S); (5) a fifth signal field specifying a shared frequency bandwidth (BW) resource over which the COA control frame packet is enabled; and (6) a sixth signal field specifying a selected first wireless AP transceiver device (2A). In selected embodiments, the instructions stored in memory, when executed by the processor, cause the first wireless AP transceiver device to receive a medium hold packet after receiving the COA control frame packet, where the medium hold packet has a predetermined minimum duration that is sufficient to allow the first wireless AP transceiver device and first shared STA device to exchange medium reservation packets. In addition, the instructions executed by the processor cause the first wireless AP transceiver device to synchronize, during the predetermined minimum duration of the medium hold packet, the transmission of the one or more first downlink packets by the first wireless AP transceiver device to the first shared STA device to be synchronized with one or more second downlink packets transmitted by the second wireless AP transceiver device to the first sharing STA device within the shared transmission opportunity.

Although the described exemplary embodiments disclosed herein are directed to wireless communication station (STA) devices which use 802.11bn encoding techniques to coordinate spatial re-use using TXOP sharing, the present invention is not necessarily limited to the example embodiments which illustrate inventive aspects of the present invention that are applicable to a wide variety of circuit designs and operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the identification of the circuit design and configurations provided herein is merely by way of illustration and not limitation and other circuit arrangements may be used. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts. When implemented in hardware, the hardware may comprise one or more of discrete components, an integrated circuit, an application-specific integrated circuit (ASIC), a programmable logic device (PLD), etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for sharing a transmission opportunity between a plurality of access point (AP) devices in accordance with an Institute of Electrical and Electronics Engineers (IEEE) 802.11 protocol, comprising:

receiving, by a shared AP device, a first coordinated spatial reuse (cSR) opportunity announcement (COA) control frame packet which comprises at least four signal fields selected from the following group of signal fields which includes:

(1) a first signal field specifying a transmit power level of a sharing AP device which transmits the first COA control frame packet, (2) a second signal field specifying duration information for one or more downlink packets to be transmitted by the sharing AP device and shared AP device, a block acknowledgement request (BAR) packet to be transmitted by the sharing AP device and shared AP device, and a block acknowledgement (BA) packet to be received by the sharing AP device and shared AP device, (3) a third signal field specifying a receive power limit information for at least a first sharing STA device associated with the sharing AP device, (4) a fourth signal field specifying pathloss information between the shared AP device and the first sharing STA device, (5) a fifth signal field specifying a shared frequency bandwidth (BW) resource over which the first COA control frame packet is enabled, and (6) a sixth signal field specifying a selected shared AP device;

computing at the shared AP device, in response to the at least four signal fields from the first COA control frame packet, a transmit power limit for limiting interference at the first sharing STA device when transmitting one or more first downlink packets by the shared AP device to a first shared STA device associated with the shared AP device; and applying, by the shared AP device, the transmit power limit when transmitting one or more first downlink packets to the first shared STA device within a shared transmission opportunity defined at the sharing AP device.

2. The method of claim 1, further comprising:

receiving, at the shared AP device, one or more sounding and feedback packets; and computing, at the shared AP device, a first channel state information estimate between the shared AP device and the first sharing STA device, and a second channel state information estimate between the shared AP device and the first shared STA device, where the shared AP device computes the transmit power limit based on the first and second channel state information estimates.

3. The method of claim 1, where the shared AP device transmits the one or more first downlink packets to the first shared STA device without medium reservation at the shared AP device, where the one or more first downlink packets are synchronized with one or more second downlink packets transmitted by the sharing AP device to the first sharing STA device within the shared transmission opportunity.

4. The method of claim 1, where the shared AP device transmits the one or more first downlink packets to the first shared STA device with medium reservation at the shared AP device, where the one or more first downlink packets are synchronized with one or more second downlink packets transmitted by the sharing AP device to the first sharing STA device within the shared transmission opportunity.

5. The method of claim 1, where the shared AP device transmits the one or more first downlink packets to the first shared STA device, where the one or more first downlink packets are not synchronized with one or more second downlink packets transmitted by the sharing AP device to the first sharing STA device within the shared transmission opportunity.

6. The method of claim 1, further comprising:

receiving, at the shared AP device, a medium hold packet after receiving the first COA control frame packet, where the medium hold packet has a predetermined minimum duration that is sufficient to allow the shared AP device and first shared STA device to exchange medium reservation packets; and synchronizing, at the shared AP device, during the predetermined minimum duration of the medium hold packet, the transmission of the one or more first downlink packets by the shared AP device to the first shared STA device to be synchronized with one or more second downlink packets transmitted by the sharing AP device to the first sharing STA device within the shared transmission opportunity.

7. The method of claim 6, where the medium hold packet received at the shared AP device has a receive power level that does not interfere with reception of any medium reservation packet by the shared AP device from the first shared STA device.

8. A method for sharing a transmission opportunity between a plurality of access point (AP) devices in accordance with an Institute of Electrical and Electronics Engineers (IEEE) 802.11 protocol, comprising:

transmitting, by a sharing AP device, a first coordinated spatial reuse (cSR) opportunity announcement (COA) control frame packet which comprises at least four signal fields selected from the following group of signal fields which includes:

(1) a first signal field specifying a transmit power level of the sharing AP device which transmits the COA control frame packet, (2) a second signal field specifying duration information for one or more downlink packets to be transmitted by the sharing AP device and a shared AP device, a block acknowledgement request (BAR) packet to be transmitted by the sharing AP device and the shared AP device, and a block acknowledgement (BA) packet to be received by the sharing AP device and the shared AP device, (3) a third signal field specifying a receive power limit information for at least a first sharing STA device associated with the sharing AP device, (4) a fourth signal field specifying pathloss information between the shared AP device and the first sharing STA device, (5) a fifth signal field specifying a shared frequency bandwidth (BW) resource over which the COA control frame packet is enabled, and (6) a sixth signal field specifying a selected shared AP device;

computing at the sharing AP device in response to the at least four signal fields from the first COA control frame packet, a transmit power limit for limiting interference at a first shared STA device associated with the shared AP device when transmitting one or more first downlink packets by the sharing AP device to a first sharing STA device; and applying, by the sharing AP device, the transmit power limit when transmitting one or more first downlink packets to the first sharing STA device within a shared transmission opportunity defined at the sharing AP device.

9. The method of claim 8, further comprising:

receiving, at the sharing AP device, one or more sounding and feedback packets; and computing, at the sharing AP device, a first uplink channel measurement from the first shared STA device to the sharing AP device, and a second downlink channel estimate between the sharing AP device and the first sharing STA device, where the sharing AP device computes the transmit power limit based on the first uplink channel measurement and the second downlink channel estimate.

10. The method of claim 8, where the one or more first downlink packets are synchronized with one or more second downlink packets transmitted by the shared AP device to the first shared STA device without medium reservation at the shared AP device.

11. The method of claim 8, where the one or more first downlink packets are synchronized with one or more second downlink packets transmitted by the shared AP device to the first shared STA device with medium reservation at the shared AP device.

12. The method of claim 8, where the one or more first downlink packets are not synchronized with one or more second downlink packets transmitted by the shared AP device to the first shared STA device within the shared transmission opportunity.

13. The method of claim 8, further comprising:

transmitting, by the sharing AP device, a medium hold packet after transmitting the first COA control frame packet, where the medium hold packet has a predetermined minimum duration that is sufficient to allow the shared AP device and first shared STA device to exchange medium reservation packets; and synchronizing, at the sharing AP device, during the predetermined minimum duration of the medium hold packet, the transmission of the one or more first downlink packets by the sharing AP device to the first sharing STA device to be synchronized with one or more second downlink packets transmitted by the shared AP device to the first shared STA device within the shared transmission opportunity.

14. The method of claim 13, where the medium hold packet transmitted by the sharing AP device has a transmit power level that does not interfere with reception of any medium reservation packet by the shared AP device from the first shared STA device.

15. The method of claim 8, further comprising:

transmitting, at the sharing AP device, a medium hold packet after transmitting the first COA control frame packet, where the medium hold packet contains one or more signal estimation fields for use by the first sharing AP device in computing an estimation of carrier frequency offset or channel coefficients between the sharing AP device and the first sharing STA device.

16. A first wireless access point (AP) transceiver device (1A) for sharing a transmission opportunity with a second wireless AP transceiver device (2A) in accordance with Institute of Electrical and Electronics Engineers 802.11 protocol, comprising:

a transceiver to exchange one or more frames with one or more wireless devices;

a processor; and a memory storing instructions that, when executed by the processor, cause the first wireless AP transceiver device (1A) to:

transmit a coordinated spatial reuse (cSR) opportunity announcement (COA) control frame packet to at least the second wireless AP transceiver device (2A), where the COA control frame packet comprises a plurality of signal fields for defining a shared transmission opportunity to be used by the first wireless AP transceiver device (1A) and the second wireless AP transceiver device (2A);

compute, based on the plurality of signal fields in the COA control frame packet, a transmit power limit for limiting interference at a first shared station (STA) device (2S) associated with the second wireless AP transceiver device (2A) when transmitting one or more first downlink packets by the first wireless AP transceiver device (1A) to a first sharing STA device (1S) associated with the first wireless AP transceiver device (1A); and apply the transmit power limit when transmitting one or more first downlink packets to the first sharing STA device (1S) within the shared transmission opportunity.

17. The first wireless AP transceiver device (1A) of claim 16, where the COA control frame packet comprises at least four signal fields selected from the following group of signal fields which includes:

(1) a first signal field specifying a transmit power level of the first wireless AP transceiver device (1A) which transmits the COA control frame packet, (2) a second signal field specifying duration information for one or more downlink packets to be transmitted by the first wireless AP transceiver device (1A) and the second wireless AP transceiver device (2A), a block acknowledgement request (BAR) packet to be transmitted by the first wireless AP transceiver device (1A) and the second wireless AP transceiver device (2A), and a block acknowledgement (BA) packet to be received by the first wireless AP transceiver device (1A) and the second wireless AP transceiver device (2A), (3) a third signal field specifying a receive power limit information for at least the first sharing STA device (1S) associated with the first wireless AP transceiver device (1A), (4) a fourth signal field specifying pathloss information between the second wireless AP transceiver device (2A) and the first sharing STA device (1S), (5) a fifth signal field specifying a shared frequency bandwidth (BW) resource over which the COA control frame packet is enabled, and (6) a sixth signal field specifying a selected second wireless AP transceiver device (2A).

18. A first wireless access point (AP) transceiver device (2A) for sharing a transmission opportunity with a second wireless AP transceiver device (1A) in accordance with Institute of Electrical and Electronics Engineers 802.11 protocol, comprising:

a transceiver to exchange one or more frames with one or more wireless devices;

a processor; and a memory storing instructions that, when executed by the processor, cause the first wireless AP transceiver device (2A) to:

receive a coordinated spatial reuse (cSR) opportunity announcement (COA) control frame packet from the second wireless AP transceiver device (1A), where the COA control frame packet comprises a plurality of signal fields for defining a shared transmission opportunity to be used by the first wireless AP transceiver device (2A) and the second wireless AP transceiver device (1A);

compute, based on the plurality of signal fields in the COA control frame packet, a transmit power limit for limiting interference at a first sharing station (STA) device (1S) associated with the second wireless AP transceiver device (1A) when transmitting one or more first downlink packets by the first wireless AP transceiver device (2A) to a first shared STA device (2S) associated with the first wireless AP transceiver device (2A); and apply the transmit power limit when transmitting one or more first downlink packets to the first shared STA device (2S) within the shared transmission opportunity.

19. The first wireless AP transceiver device of claim 18, where the COA control frame packet comprises at least four signal fields selected from the following group of signal fields which includes:

(1) a first signal field specifying a transmit power level of the second wireless AP transceiver device (1A) which transmits the COA control frame packet, (2) a second signal field specifying duration information for one or more downlink packets to be transmitted by the first wireless AP transceiver device (2A) and the second wireless AP transceiver device (1A), a block acknowledgement request (BAR) packet to be transmitted by the first wireless AP transceiver device (2A) and the second wireless AP transceiver device (1A), and a block acknowledgement (BA) packet to be received by the first wireless AP transceiver device (2A) and the second wireless AP transceiver device (1A), (3) a third signal field specifying a receive power limit information for at least the first sharing STA device (1S) associated with the second wireless AP transceiver device (1A), (4) a fourth signal field specifying pathloss information between the first wireless AP transceiver device (2A) and the first sharing STA device (1S), (5) a fifth signal field specifying a shared frequency bandwidth (BW) resource over which the COA control frame packet is enabled, and (6) a sixth signal field specifying a selected first wireless AP transceiver device (2A).

20. The first wireless AP transceiver device of claim 18, where the instructions stored in memory, when executed by the processor, cause the first wireless AP transceiver device to:

receive a medium hold packet after receiving the COA control frame packet, where the medium hold packet has a predetermined minimum duration that is sufficient to allow the first wireless AP transceiver device and first shared STA device to exchange medium reservation packets; and synchronize, during the predetermined minimum duration of the medium hold packet, the transmission of the one or more first downlink packets by the first wireless AP transceiver device to the first shared STA device to be synchronized with one or more second downlink packets transmitted by the second wireless AP transceiver device to the first sharing STA device within the shared transmission opportunity.

* * * * *